United States Patent

Wöhrl

Patent Number: 5,099,966
Date of Patent: Mar. 31, 1992

[54] METHOD AND APPARATUS FOR REGULATING THE DAMPING OF ROTATING MASSES

[75] Inventor: Bernhard Wöhrl, Gauting, Fed. Rep. of Germany

[73] Assignee: MTU Motoren- und Turbinen-Union Munchen GmbH, Fed. Rep. of Germany

[21] Appl. No.: 613,056

[22] Filed: Nov. 15, 1990

[30] Foreign Application Priority Data

Nov. 23, 1989 [DE] Fed. Rep. of Germany ....... 3938770

[51] Int. Cl.$^5$ ................................ F16F 11/00
[52] U.S. Cl. .................... 188/322.5; 188/276; 188/277; 384/448
[58] Field of Search ........ 188/322.5, 276, 277, 188/290, 294; 384/448, 399

[56] References Cited

U.S. PATENT DOCUMENTS

| | | | |
|---|---|---|---|
| 2,718,149 | 9/1955 | Bamford et al. | 188/276 |
| 3,070,192 | 12/1962 | Barkalow | 188/276 |
| 3,124,395 | 3/1964 | Sternlicht | 384/399 |
| 3,167,966 | 2/1965 | Ashleman | 188/277 |
| 3,456,992 | 7/1969 | Kulina | 384/478 |
| 4,161,237 | 7/1979 | Uchida et al. | 188/322.5 |
| 4,696,585 | 9/1987 | Swearingen | 384/448 |
| 4,781,077 | 9/1965 | El-Sahfei | 74/573 |
| 4,915,510 | 4/1990 | Arvidsson | 384/448 |

FOREIGN PATENT DOCUMENTS 0206814 9/1986 Japan ....................... 384/448

Primary Examiner—Joseph F. Peters, Jr.
Assistant Examiner—Christopher P. Ellis
Attorney, Agent, or Firm—Evenson, Wands, Edwards, Lenahan & McKeown

[57] ABSTRACT

A method and apparatus for regulating the damping of masses rotating on roller bearings. An oil pressure film in an oil pressure gap has its viscosity changed via temperature control as a function of the vibrating condition of the rotating masses in order to provide an optimally quiet operation of the rotating system.

14 Claims, 1 Drawing Sheet

METHOD AND APPARATUS FOR REGULATING THE DAMPING OF ROTATING MASSES

BACKGROUND AND SUMMARY OF THE INVENTION

This invention relates to a method and apparatus for regulating the damping of masses rotating on roller bearings and, more particularly, for regulating the damping of masses by using an oil/lubricant squeezing or pressure film located in an oil squeezing or pressure seal gap or space.

It is known, for example, to arrange oil or lubricant squeezing or pressure films of this type between the bearing housing and the spring cage of a shaft bearing. The oil pressure film, while interacting with the spring cage as a spring damping system, functions to counteract an unbalanced state of the rotating masses caused during the manufacturing of the parts. The oil pressure film further ensures a secure distance between the natural frequency or the harmonic oscillations of the rotating system and the operating frequencies of the system.

To accomplish this, a theoretically required damping value is calculated for the oil pressure film and a spring constant value is calculated for the spring cage. The geometry of the oil pressure gap is then designed accordingly, the gap width being between $3 \times 10^{-3}$ and $5 \times 10^{-3}$ times the nominal diameter "d". However, once construction of the oil pressure gap is completed, if any unsatisfactory results are achieved for test runs of the rotating masses, then only the spring constant of the spring cage can be improved by performing mechanical aftertreatments on the spring cross-section. Any improvement or regulation of the spring damping behavior to achieve quieter running of the rotating system is not possible during the operation of the system.

There is therefore needed a method and apparatus of the above-mentioned type ensuring a quieter running of the rotating masses. The method and apparatus must achieve the quieter operation using measures which do not require any interruption of the operation. The method and apparatus must detect changes in the vibrational behavior of the system as they occur and dampen them in such a manner that breakdown or destruction of the rotating system is avoided.

These needs are met by the present invention which provides for the measurement of the momentary viscosity of the oil by detecting the temperature of the oil pressure film. The vibrational behavior of the rotating masses is measured with respect to the frequency and the amplitude and the viscosity of the oil is then varied by controlling the temperature of a heating/cooling system for the oil in a manner to achieve an optimally quiet running of the rotating system.

It is an advantage of the present invention to adapt the damping of the oil pressure film to the vibration behavior of the rotating masses without requiring any geometrical change of the oil pressure gap. In addition, because the damping effect of the oil pressure film can be regulated by way of the oil temperature, larger manufacturing tolerances may be permitted during the manufacture of the oil pressure gap. Further, the present invention avoids the costs and labor involved in reconstructing the geometric design of the spring damping system.

An embodiment of the invention provides for the temperature control of the oil to occur by the heat exchange of a heating/cooling liquid, such as oil, water, methanol or Glysantine, which is guided up to the oil pressure film. Because the intensive heat exchange between the heating/cooling liquid, the contact surfaces and the oil pressure film, the viscosity of the oil in the oil pressure gap is increased or decreased accordingly during a cooling or heating. As a result, damping of the oil pressure film can be adapted to the operating conditions of the rotating system.

A further embodiment of the invention provides for the temperature control to occur by means of electric current control of Peltier-elements which are arranged in the area of the oil pressure film. This embodiment has the advantage that no liquid media must be transported, sealed off or thermally regulated in the system.

The present invention is preferably used for varying the damping constant of the rotating system by a factor of 0.5 to 2 through the use of cooling and heating of the oil pressure film whereby a quieter running of the rotating mass system is possible.

The present invention is carried out using a heating/cooling system having a thermoelement in the area of the contact surfaces of the oil pressure film. The thermoelement is in an operative connection with a computer which, at the same time by way of a vibration sensor, senses the vibration condition of the rotating system on the basis of the frequency and amplitude. The computer then compares the received data with a predetermined viscosity vs. temperature diagram The computer is operatively connected, by way of a controlling device, with heating/cooling elements of the heating/cooling system to effect changes in the oil pressure seal temperature and hence the oil viscosity for regulating the damping of the system.

It is an advantage of the invention that indirect heating and cooling of the essentially standing oil pressure film is achieved. By means of the indirect heating and cooling of the oil pressure film, changes in the oil temperature are achieved with lower time constants than by exchanging the standing oil in the oil pressure film with hotter or cooler oil. In addition, the indirect heating or cooling of the oil pressure film permits higher temperature stability. The linking of the vibration condition of the rotating masses with the measured data for oil temperature, i.e. the oil viscosity, by means of the computer, such as a microprocessor, has the advantage of providing quick responses to changes concerning the quiet running of the rotating system within a very short time.

In one embodiment of the invention, cooling ducts helically surround the oil pressure gap in the area of the oil pressure film. In this manner, the computer reacts by way of connecting lines through which the temperature-regulated heating/cooling liquid is fed to the cooling ducts from a heatable and coolable heating/cooling-liquid storage tank. For example, a computer-controlled heating spiral can dip into the heating/cooling storage tank. A heating/cooling arrangement of this type advantageously forms a closed loop system.

Another embodiment of the invention includes Peltier elements in the heating/cooling arrangement which, in the manner of a shell, surround the contact surfaces of the oil pressure film. This heating/cooling arrangement has the advantage of using only static functioning elements and is thus less susceptible to disturbances than heating/cooling systems which require movable or flowing functional elements.

For corresponding intrinsic cooling of the rotating system in the bearing area, ohmic heating devices may also be used for regulating the oil temperature of the oil pressure film. Ohmic heating devices of this type need only a small installation volume and allow flexible constructive design possibilities.

Because the oil pressure gap has a width of between 100 and 300 μm, it is preferable that at least one housing-side contact surface of the oil pressure film have a heating/cooling system. One-sided heating or cooling of the oil pressure film may advantageously be provided if the opposite contact surface of the oil pressure film includes a heat insulating layer.

The time constant for regulation of the temperature of the oil pressure film can be improved considerably if the heating/cooling elements of the heating/cooling apparatus are enclosed by a heat insulating layer in the direction of the surrounding housing.

Other objects, advantages and novel features of the present invention will become apparent from the following detailed description of the invention when considered in conjunction with the accompanying drawings.

DETAILED DESCRIPTION OF THE DRAWINGS

Figure 1:
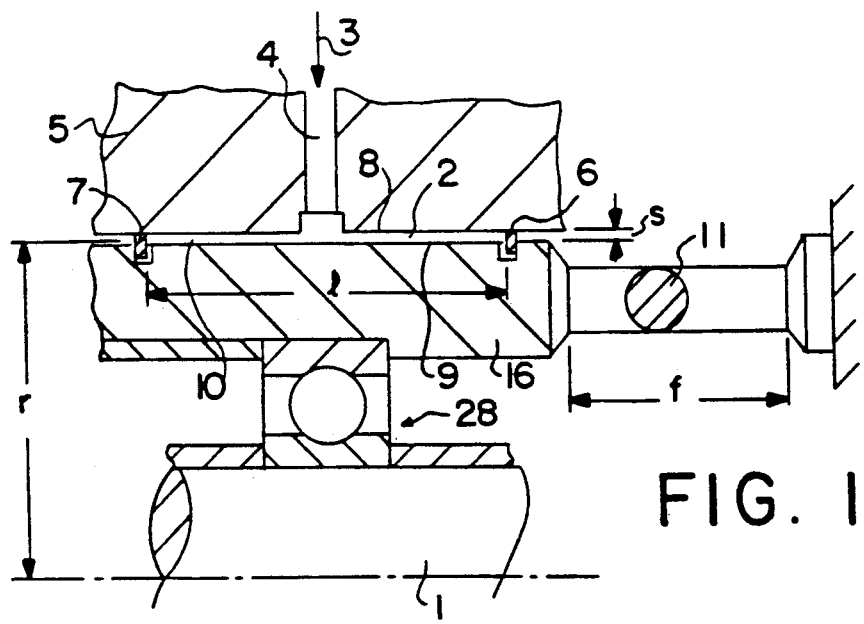
FIG. 1 is a cross sectional view of a spring damping system of masses rotating on roller bearings without any regulating or damping of the system.

FIG. 1 illustrates a spring damping system of masses rotating on roller bearings 28 which are force-lockingly or form-fittingly connected with the shaft. No regulation of the damping in the system is shown. The damping is achieved by means of the oil pressure gap 2 which, in this example, has a gap width "s" of 200 μm and a gap length "L" of 60 mm with a radius "r" of 75 mm. The oil pressure gap 2 is supplied with oil or other appropriate lubricants by way of the oil feeding bore 4 in the bearing housing 5. The oil supply 3 compensates for any oil leakage flow escaping by way of the squeeze seals 6 and 7. The damping is determined by the viscosity of the oil at the operating temperature, the size of the contact surfaces 8 and 9 for the oil pressure film 10 and the gap width s of the oil squeezing gap 2. The spring constant is essentially determined by the spring length "f", the spring cross-section II and the material of the spring cage 16. This spring damping system is optimized for a predetermined operating condition of the rotating masses.

Figure 2:
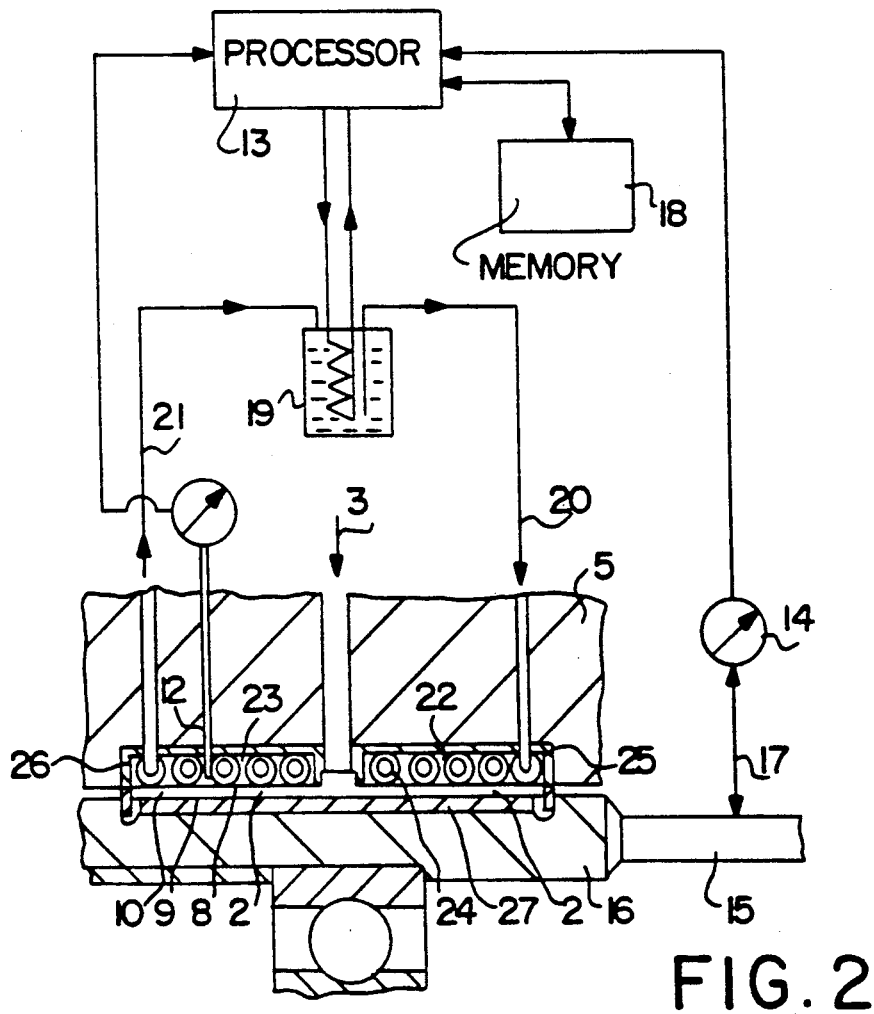
FIG. 2 is a cross sectional view and functional block diagram of a spring damping system having a regulated damping.

FIG. 2 illustrates a spring damping system which regulates the damping of the system by changing the viscosity of the oil in the oil pressure gap 2 by controlling the temperature of the oil pressure film 10. For this purpose, the temperature of the oil pressure film 10 is detected by a thermoelement 12 the output of which is fed to a microprocessor 13. The microprocessor 13, at the same time, registers the vibration condition of the rotating system with respect to the frequency and the amplitude via a vibration sensor 14. The vibration sensor 14 is in an operative connection 17 with one of the spring arms 15 of the spring cage 16.

In the microprocessor 13, vibration and temperature data are compared with a predetermined viscosity vs. temperature diagram which can be stored in a memory 18. A heating/cooling arrangement 19 is controlled by the microprocessor 13 such that an optimally quiet running of the rotating system is achieved. By way of feed lines 20 and return lines 21, the heating/cooling arrangement supplies heating/cooling elements 22 and 23 which, in the form of heating/cooling ducts 24 helically surround the oil pressure film 10 on its housing-side contact surface 8. Between the bearing housing 5 and the heating/cooling elements 22 and 23, heat insulating layers 25 and 26 are inserted to reduce any influencing of the housing temperature by the heat. The contact surface 9 of the oil pressure film 10 is formed of a polished surface of a heat insulating layer 27 which thermally insulates the oil pressure film from the spring cage 16.

What is claimed is:

1. A method using an oil pressure film located in an oil pressure gap for regulating a damping of masses rotating on roller bearings in a rotating system, the oil pressure film forming contact surfaces with the oil pressure gap, the method comprising the steps of:
   detecting the temperature of the oil pressure film;
   determining a momentary viscosity of oil forming the oil pressure film from said detecting step;
   measuring the vibration behavior of the rotating masses with respect to its frequency and amplitude; and
   controlling the temperature of a heating/cooling device to vary the momentary viscosity of oil forming the oil pressure film by heating/cooling the contact surfaces of the oil pressure film in a manner achieving an optimally quiet running of the rotating system.

2. A method according to claim 1, wherein the step of controlling the temperature comprising the step of:
   guiding a heating/cooling liquid to the oil pressure gap for providing a heat exchange at the contact surface.

3. A method according to claim 1, wherein the step of controlling the temperature, comprises the step of:
   providing electric current control of Peltier elements locatable in the area of the oil pressure gap.

4. A method according to claim 1, wherein the step of controlling the temperature varies a damping constant of the rotating system by a factor of 0.5 to 2 via the cooling and heating of the oil pressure film.

5. A method according to claim 2, wherein the step of controlling the temperature varies a damping constant of the rotating system by a factor of 0.5 to 2 via the cooling and heating of the oil pressure film.

6. A method according to claim 3, wherein the step of controlling the temperature varies a damping constant of the rotating system by a factor of 0.5 to 2 via the cooling and heating of the oil pressure film.

7. An apparatus for regulating the damping of masses rotating on roller bearings in a rotating system having an oil pressure gap containing an oil pressure film, the oil pressure film forming contact surfaces with the oil pressure gap, comprising:
   a computer;
   a heating/cooling system having heating/cooling elements for heating/cooling the contact surfaces of the oil pressure film including a control device in operative connection with said computer;
   a thermoelement, coupled to said computer, said thermoelement being located in the area of the contact surfaces of the oil pressure film;

a vibration sensor coupled to said computer for detecting a vibration condition of the rotating system with respect to frequency and amplitude;

wherein said computer receives data from said thermoelement and vibration sensor for comparison with a predetermined viscosity-temperature diagram and provides control information to said control device.

8. An apparatus according to claim 7, wherein the heating/cooling system includes cooling/heating ducts carrying a heating/cooling liquid, said ducts surround the contacts surface of the oil pressure film and are connected with a heatable and a coolable heating/cooling liquid storage tank.

9. An apparatus according to claim 7, wherein the heating cooling system includes Peltier elements surrounding the contacts surfaces of the oil pressure film in a shell-type manner.

10. An apparatus according to claim 7, wherein at least one housing-side contact surface of the oil pressure film has the heating/cooling system.

11. An apparatus according to claim 8, wherein at least one housing-side contact surface of the oil pressure film has the heating/cooling system.

12. An apparatus according to claim 9, wherein at least one housing-side contact surface of the oil pressure film has the heating/cooling system.

13. An apparatus according to claim 8, wherein the cooling/heating ducts have a heat insulating layer in the direction of the surrounding housing.

14. An apparatus according to claim 9, wherein the cooling/heating ducts have a heat insulating layer in the direction of the surrounding housing.

* * * * *